(12) United States Patent
Choi et al.

(10) Patent No.: US 7,672,652 B2
(45) Date of Patent: Mar. 2, 2010

(54) COORDINATOR'S DATA TRANSMISSION METHOD, DEVICE'S DATA RECEPTION METHOD, COORDINATOR USING THE COORDINATOR'S DATA TRANSMISSION METHOD, AND DEVICE USING THE DEVICE'S DATA RECEPTION METHOD IN ZIGBEE SYSTEM

(75) Inventors: Soon-jin Choi, Seongnam-si (KR); Min-seop Jeong, Seoul (KR); Woo-jong Park, Seoul (KR); Seung-hwan Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 920 days.

(21) Appl. No.: 11/274,157

(22) Filed: Nov. 16, 2005

(65) Prior Publication Data
US 2006/0174030 A1 Aug. 3, 2006

(30) Foreign Application Priority Data
Feb. 3, 2005 (KR) .................. 10-2005-0009819

(51) Int. Cl.
*H04B 1/18* (2006.01)
(52) U.S. Cl. ............... 455/171.1; 455/181.1; 455/343.4; 455/343.2; 455/231; 370/347; 370/350
(58) Field of Classification Search ............... 455/171.1, 455/181.1, 343.4, 343.2, 231, 41.2; 370/347, 370/350, 506, 509
See application file for complete search history.

(56) References Cited

U.S. PATENT DOCUMENTS

| 7,158,047 | B2 * | 1/2007 | Ushida ................. 340/825.72 |
| 7,412,265 | B2 * | 8/2008 | Chen et al. ................. 455/574 |
| 2003/0081603 | A1 * | 5/2003 | Rune .......................... 370/390 |
| 2005/0074036 | A1 * | 4/2005 | Gorday et al. .............. 370/513 |
| 2005/0171662 | A1 * | 8/2005 | Strege et al. .................. 701/33 |
| 2006/0007907 | A1 * | 1/2006 | Shao et al. .................. 370/347 |
| 2006/0023711 | A1 * | 2/2006 | Perret et al. ................. 370/389 |
| 2006/0072586 | A1 * | 4/2006 | Callaway et al. ........ 370/395.62 |
| 2006/0150211 | A1 * | 7/2006 | Ritter .......................... 725/31 |
| 2006/0154642 | A1 * | 7/2006 | Scannell .................. 455/404.1 |
| 2006/0182056 | A1 * | 8/2006 | Kim et al. ................... 370/328 |
| 2007/0010206 | A1 * | 1/2007 | Caldwell et al. .............. 455/64 |
| 2007/0019672 | A1 * | 1/2007 | Guthrie ...................... 370/466 |
| 2007/0036090 | A1 * | 2/2007 | Bhatti ....................... 370/254 |
| 2007/0147332 | A1 * | 6/2007 | Lappetelainen et al. ..... 370/346 |
| 2007/0183457 | A1 * | 8/2007 | Leitch ....................... 370/498 |
| 2007/0252724 | A1 * | 11/2007 | Donaghey et al. ........... 340/905 |

(Continued)

FOREIGN PATENT DOCUMENTS

WO  WO 2004049631 A1 * 6/2004

*Primary Examiner*—Minh D Dao
(74) *Attorney, Agent, or Firm*—Sughrue Mion, PLLC

(57) ABSTRACT

A coordinator's data transmission method, a device's data reception method, a coordinator using the coordinator's data transmission method and a device using the device's data reception method are provided. In a Zigbee system including at least one device and a coordinator for coordinating the device, in a case where a frame pending bit in a beacon frame is determined to be a value representing a direct transmission method, a beacon frame containing an address of a device to receive data and a data transmission time is generated and data is transmitted from the coordinator at the data transmission time. Data transmission time and power consumption can be reduced.

12 Claims, 6 Drawing Sheets

U.S. PATENT DOCUMENTS

2007/0288553 A1* 12/2007 Donaghey et al. ........... 709/203
2008/0037485 A1* 2/2008 Osinga et al. ............... 370/338
2008/0042871 A1* 2/2008 Donaghey et al. ...... 340/870.01
2008/0056261 A1* 3/2008 Osborn et al. ............... 370/392
2008/0075005 A1* 3/2008 Kim et al. ................... 370/230
2008/0080719 A1* 4/2008 Ahn et al. ..................... 381/17

* cited by examiner

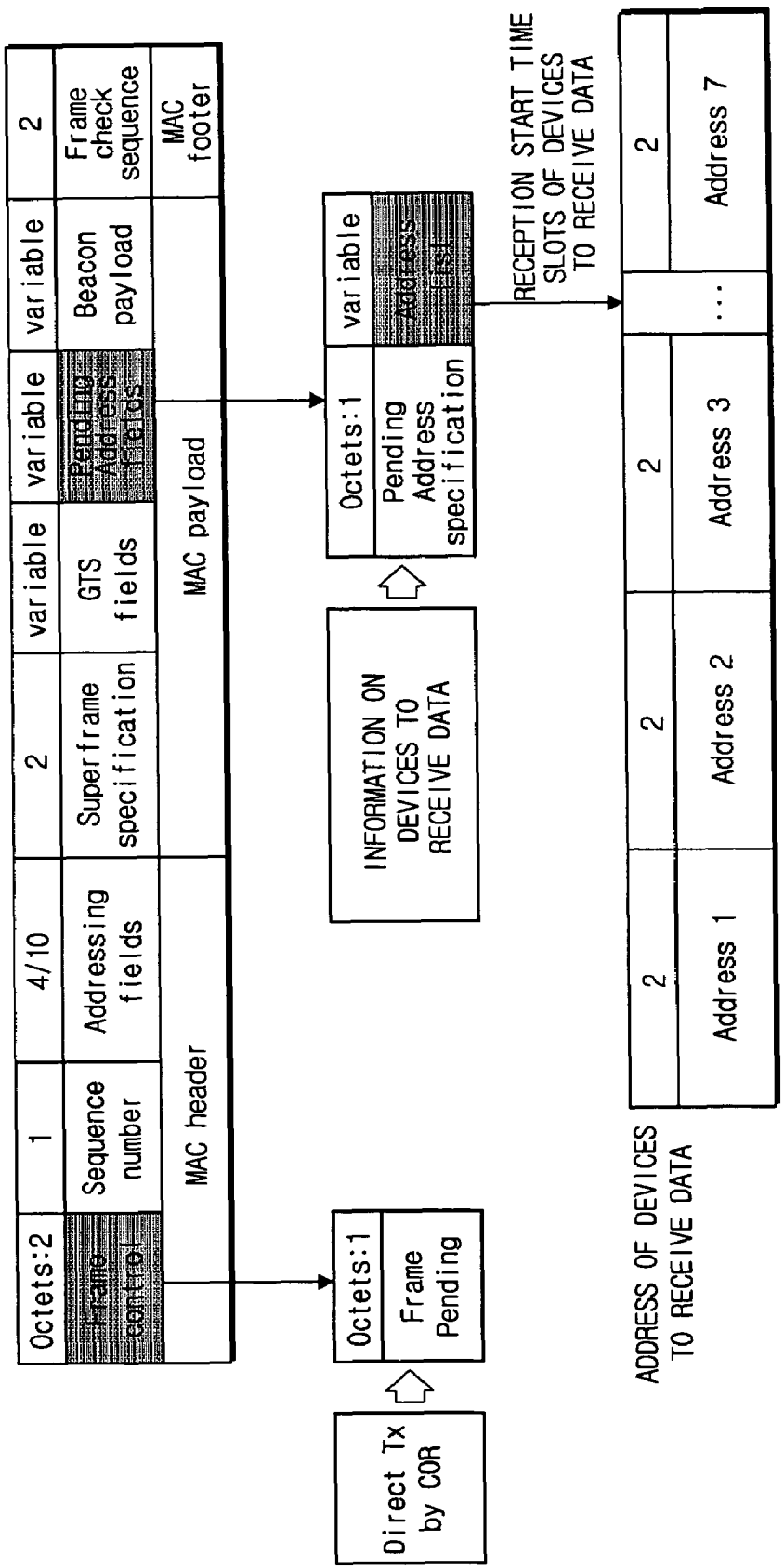

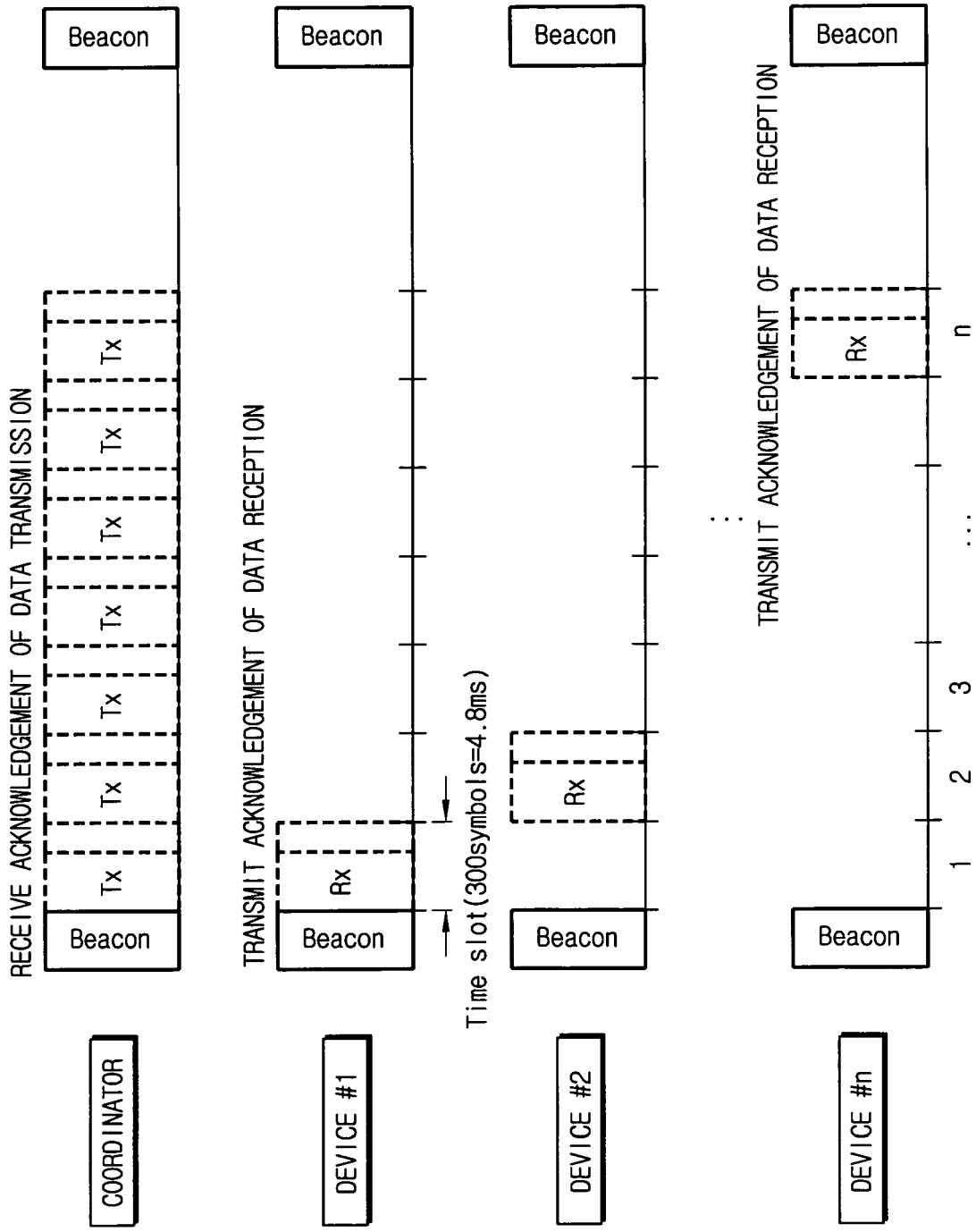

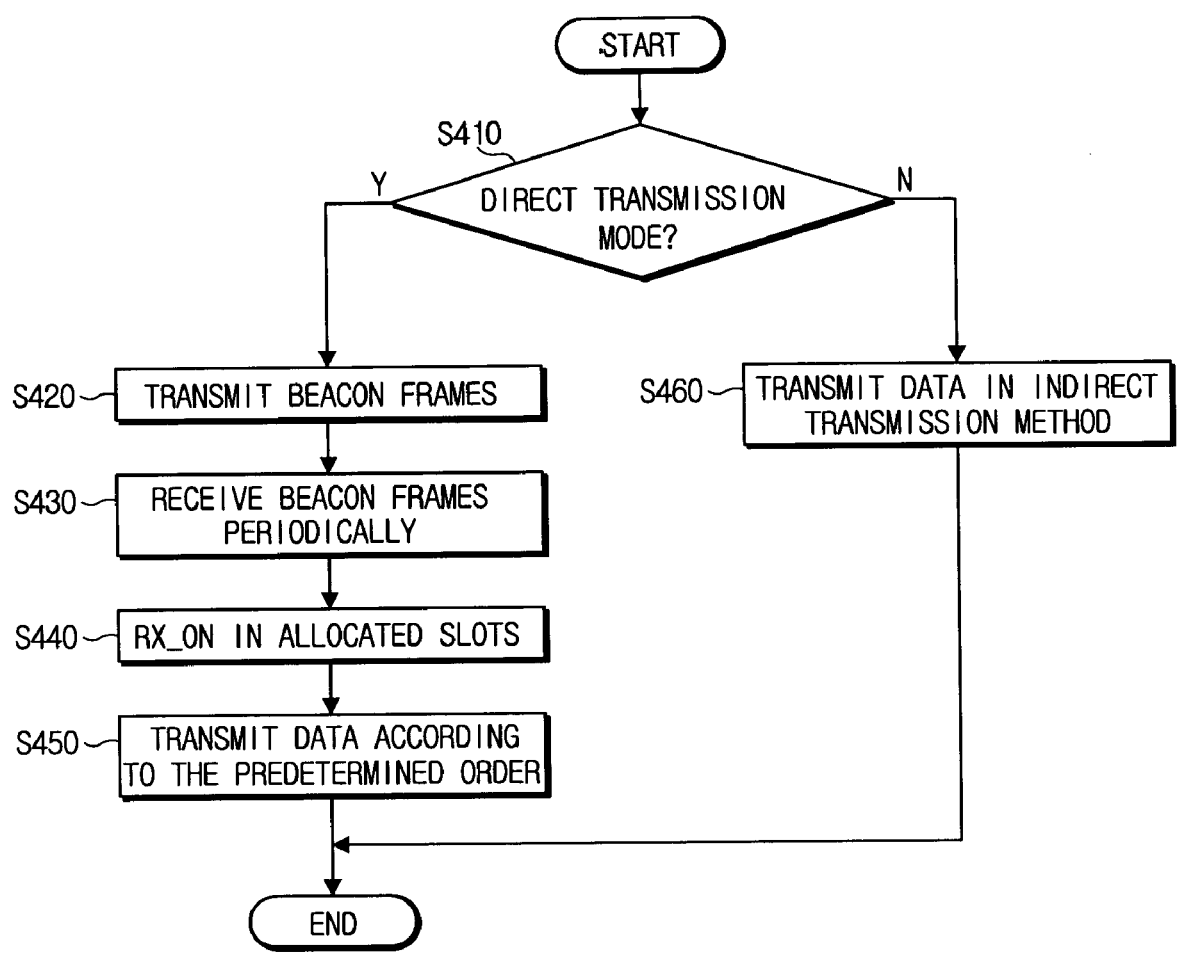

COORDINATOR'S DATA TRANSMISSION METHOD, DEVICE'S DATA RECEPTION METHOD, COORDINATOR USING THE COORDINATOR'S DATA TRANSMISSION METHOD, AND DEVICE USING THE DEVICE'S DATA RECEPTION METHOD IN ZIGBEE SYSTEM

This application claims priority from Korean Patent Application No. 10-2005-0009819 filed on Feb. 3, 2005 in the Korean Intellectual Property Office, the entire content of which is incorporated herein by reference.

BACKGROUND OF THE INVENTION

1. Field of the Invention

The present invention relates to a coordinator's data transmission method, a device's data reception method, a coordinator using the data transmission method and a device using the data reception method in a Zigbee system, and more particularly to a coordinator's data transmission method using a direct transmission method, a device's data reception method, a coordinator using the coordinator's data transmission method and a device using the device's data reception method in a Zigbee system.

2. Discussion of Related Art

Zigbee is a standard for low-data-rate communications and it is designed for low power so that one battery can last for about a year in a Zigbee system. It costs about a half in comparison with a Bluetooth system by minimizing the number of software and relational compartments. Therefore, it is suitable for a home network operating based on control devices and sensors in a wireless communication technology. Further, the Zigbee standard is advantageous in that it enables several tens of thousands of devices to connect in a network while the Bluetooth can connect at most several hundred devices in a network.

FIG. 1 illustrates a conceptual diagram showing a data transmission/reception method in accordance with a related art. A typical data transmission/reception method will be described below with reference to FIG. 1.

The basic goal of the Zigbee is to facilitate communication between devices 20 minimizing power consumption of each device 20. Accordingly, a coordinator 10 for coordinating a Zigbee system and a plurality of devices 20 always keeps its state as RX_ON and each device 20 normally keeps its state as RX_OFF. In a case where data transmission occurs from the devices 20 to the coordinator 10, direct transmission is possible. But direct transmission is not possible for data transmission from the coordinator 10 to the devices 20.

In a case where the coordinator 10 has data to be transmitted to the devices 20 in a Zigbee system, the data can not be directly transmitted to the corresponding device 20 but the coordinator 10 informs the device 20 of existence of data by a beacon frame. That is, an address of the corresponding device 20 to receive the data is recorded in a pending address field of the beacon frame, and then the beacon frame is transmitted to the corresponding device 20. The corresponding device 20 which received the beacon frame recognizes that there is data to be received from the coordinator 10 and then makes and sends a data request command to the coordinator 10. As described above, after the device 20 sends the data request command, it keeps its state as RX_ON and can then receive the data from the coordinator 10.

That is, even if the coordinator 10 has data to be transmitted to the device 20, the coordinator 10 can not directly transmit the data but indirectly transmits the data after receiving the data request command from the device 20.

In conclusion, the coordinator 10 can transmit data to the device 20 only in an indirect transmission method in a conventional Zigbee system in a case where the coordinator 10 transmits data to the device 20. Accordingly, the conventional Zigbee system is disadvantageous in that it consumes power to exchange a data request command and an acknowledgement ACK thereof between the coordinator 10 and the devices 20. Further, the conventional Zigbee system is disadvantageous in that it wastes power due to message collision between the data request commands and the data, which occurs when the coordinator 10 and a plurality of the devices 20 communicate with each other. Still further, the conventional Zigbee system is disadvantageous in that there occurs a delay time to transmit data to the device 20 because the coordinator 10 can not directly transmit data to the device 20 and must wait until it receives the data request command from the device 20.

SUMMARY OF THE INVENTION

An aspect of the present invention is to provide a data transmission method in which a coordinator directly transmits data to a device without waiting to receive a data request command from the device when the coordinator has data to transmit to the device, a data reception method, a coordinator using the data transmission method and a device using the data reception method.

In accordance with an aspect of the present invention, there is provided a coordinator's data transmission method in a Zigbee system which includes at least one device and a coordinator for coordinating a Zigbee system and the device(s), wherein the coordinator transmits data to the device(s) in a direct transmission method in a case where a frame pending bit in a beacon frame is determined to be a value representing the direct transmission method, the coordinator's data transmission method includes the steps of generating the beacon frame having an address of the device to receive the data and data transmission time, and transmitting the data at the data transmission time.

The frame pending bit in the beacon frame can be determined to be a different value representing an indirect transmission method in which the coordinator transmits the data after receiving a data request command, where the different value is provided to make the coordinator and the devices compatible with a system using the indirect transmission method.

In accordance with another aspect of the present invention, there is provided a device's data reception method, in which a device receives data from a coordinator, in a Zigbee system including at least one device and a coordinator for coordinating the device(s), the method including checking whether a received beacon frame contains information of existence of data to be received by a device and data transmission time, and keeping its state as RX_ON by the device at the data transmission time in a case where the device realizes the data existence.

The maximum number of data transmission slots allocated based on the beacon frames may be 7, and the maximum size of one slot may be 4.8 ms.

In accordance with another aspect of the present invention, there is provided a coordinator for coordinating at least one device in a Zigbee system, the coordinator including a first transmitter for providing a communication interface between the device(s) and the coordinator, a beacon generator for generating a beacon frame containing an address of each device to receive data, and a first controller for sequentially transmitting the data to the device(s) according to the address recorded order.

In accordance with still another aspect of the present invention, there is provided a device for receiving data from a coordinator in a Zigbee system, the device including a second transmitter for providing a communication interface between the coordinator and the device(s), a slot counter for counting data transmission slots allocated based on beacon frames and confirming the data transmission order, a data request command generator for generating a data request command which would be used in a circumstance that the device(s) and the coordinator are compatible with an indirect transmission system, and a second controller for keeping the device(s)' state as RX_ON in turns according to the data transmission order.

BRIEF DESCRIPTION OF THE DRAWINGS

The above and/or other aspects of the present invention will be more apparent by describing in detail exemplary embodiments thereof with reference to the attached drawings in which:

FIG. 4 is a view showing an exemplary beacon frame for use in the method in accordance with an exemplary embodiment of the present invention;

FIG. 5 is a conceptual view of a Zigbee system in which there are n transaction data when implementing the data transmission method and the data reception method in accordance with an exemplary embodiment of the present invention;

FIG. 6 is a flow chart showing a data transmission method and a data reception method in accordance with an exemplary embodiment of the present invention.

DETAILED DESCRIPTION OF EXEMPLARY EMBODIMENTS

Hereinafter, the present invention will be described in detail by describing exemplary embodiments of the present invention with reference to accompanying drawings. The exemplary embodiments depicted below are provided as examples for helping those of ordinary skill in the art to better understand the spirit of the prevent invention. Accordingly, the present invention is not limited to the exemplary embodiments disclosed below but may be realized in modified forms. In describing the present invention, detailed description on functions and constructions with reference to the related arts can be omitted if it is determined that it masks the present invention in unnecessary detail.

Figure 1:
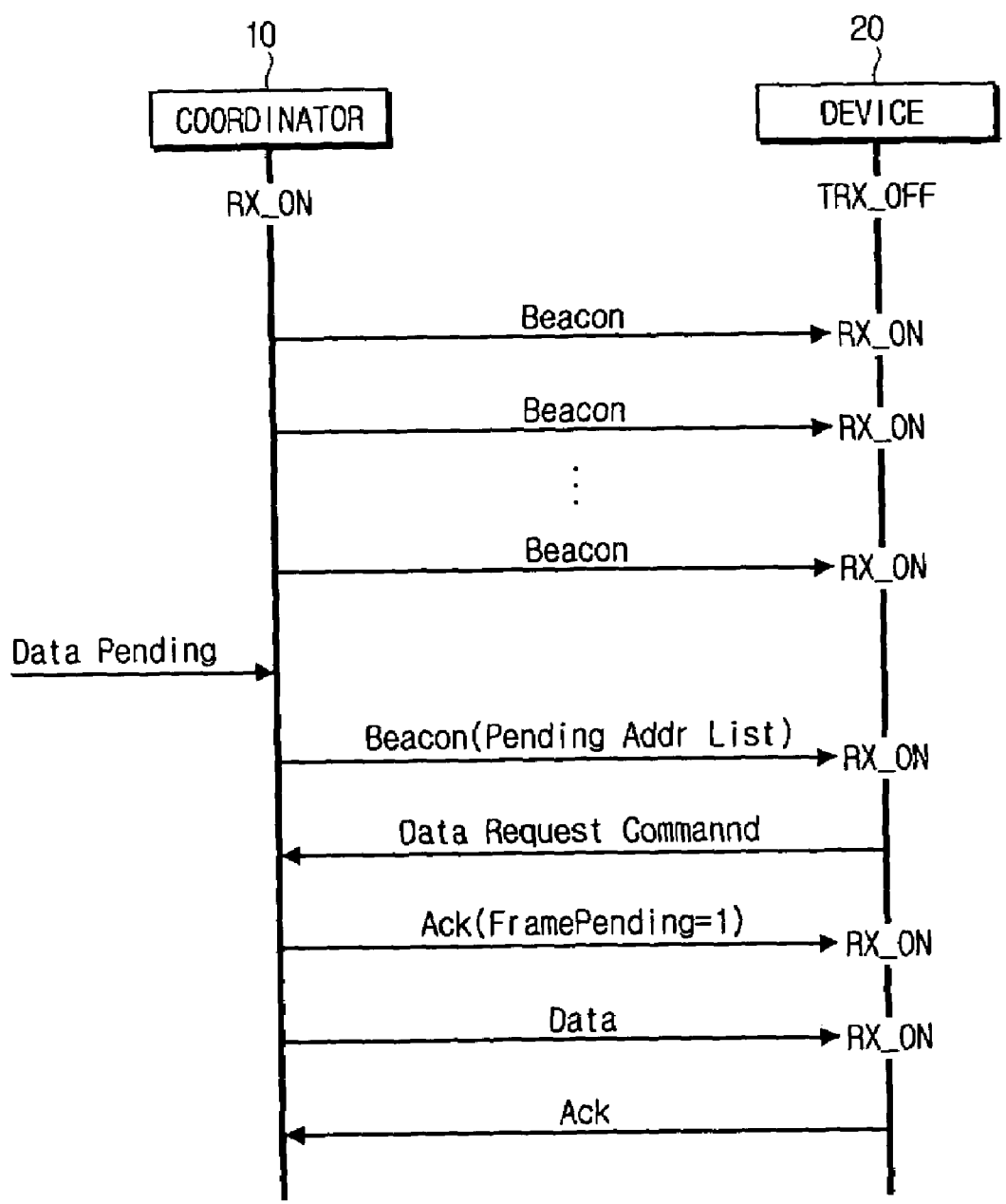
FIG. 1 is a conceptual view to explain a data transmission method and a data reception method in accordance with the related art.
Figure 2:
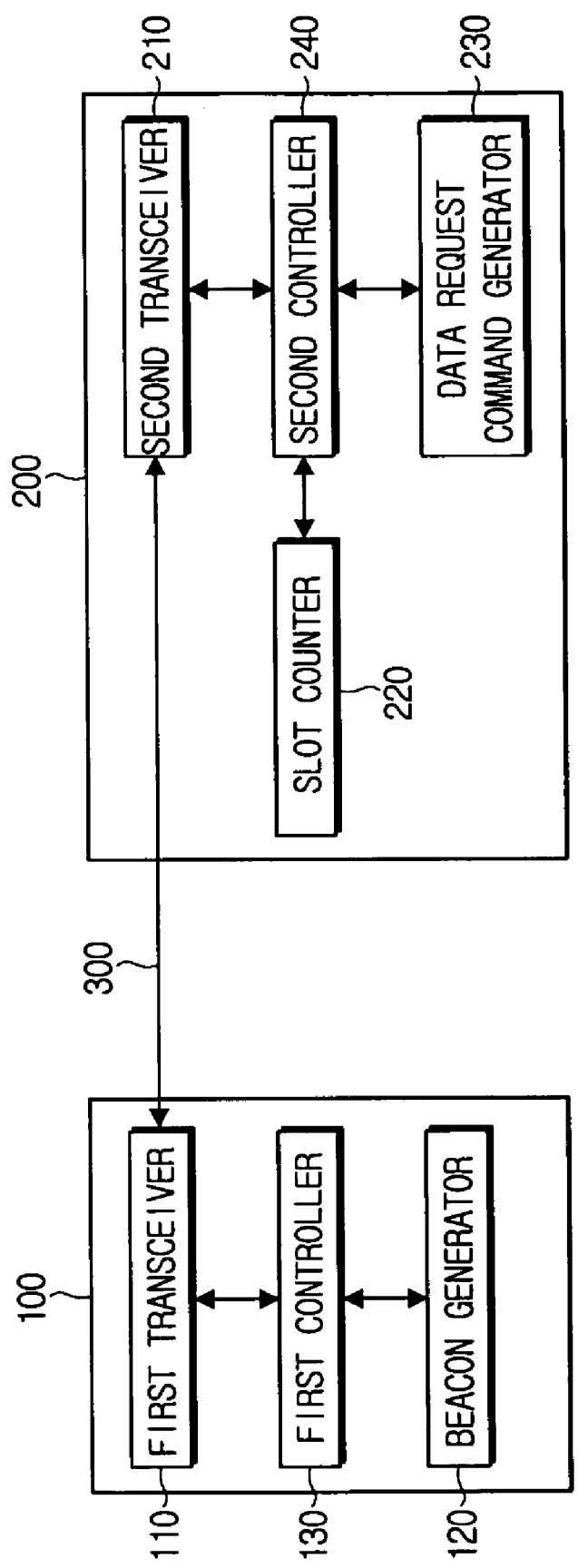
FIG. 2 is a block diagram of a Zigbee system using the data transmission/reception method in accordance with an exemplary embodiment of the present invention.

FIG. 2 illustrates a block diagram of a Zigbee system using a data transmission method and a data reception method in accordance with an exemplary embodiment of the present invention.

Referring to FIG. 2, a Zigbee system includes a coordinator 100, and a device 200 connected to the coordinator 100 by a communication interface 300. The coordinator 100 has a first transceiver 110, a Beacon generator 120, and a first controller 130.

The first transceiver 110 provides the communication interface 300 between the device 200 and the coordinator 100, and the beacon generator 120 generates a beacon frame used as a synchronization signal.

The first controller 130 controls each element constituting the coordinator 100 and controls the beacon frame, which is the synchronization signal generated from the beacon generator 120 to be broadcast through the first transceiver 110. The first controller 130 transmits data exactly to the device 200 to receive the data, and controls transmission operations so as for the data to be transmitted to the devices 200 in the right order in a case where there are a lot of data to be transmitted to a plurality of the devices 200.

Here, the order of data transmissions is determined by the address recorded order, i.e. the order that addresses corresponding to the devices 200 to receive the data are recorded in frame pending address fields of respective beacon frames (see FIG. 4).

Meanwhile, the device 200 has a second transceiver 210, a slot counter 220, and a second controller 240. The second transceiver 210 provides a communication interface 300 between the coordinator 100 and the device 200, and the slot counter 220 counts data transmission slots, confirms the order of data receptions with respect to the corresponding devices 200, and computes standby times for the devices 200, respectively, which correspond to the order of the data receptions.

The data request command generator 230 is used in a case where the device is compatibly used with a conventional system using an indirect transmission method. In such case, a frame control bit (See FIG. 4) has the value "0," and generates data request commands.

The second controller 240 controls the operation of each element constituting the device 200, and each device 200 keeps its state as RX_ON in its allocated slot and controls itself to receive the data.

Figure 3:
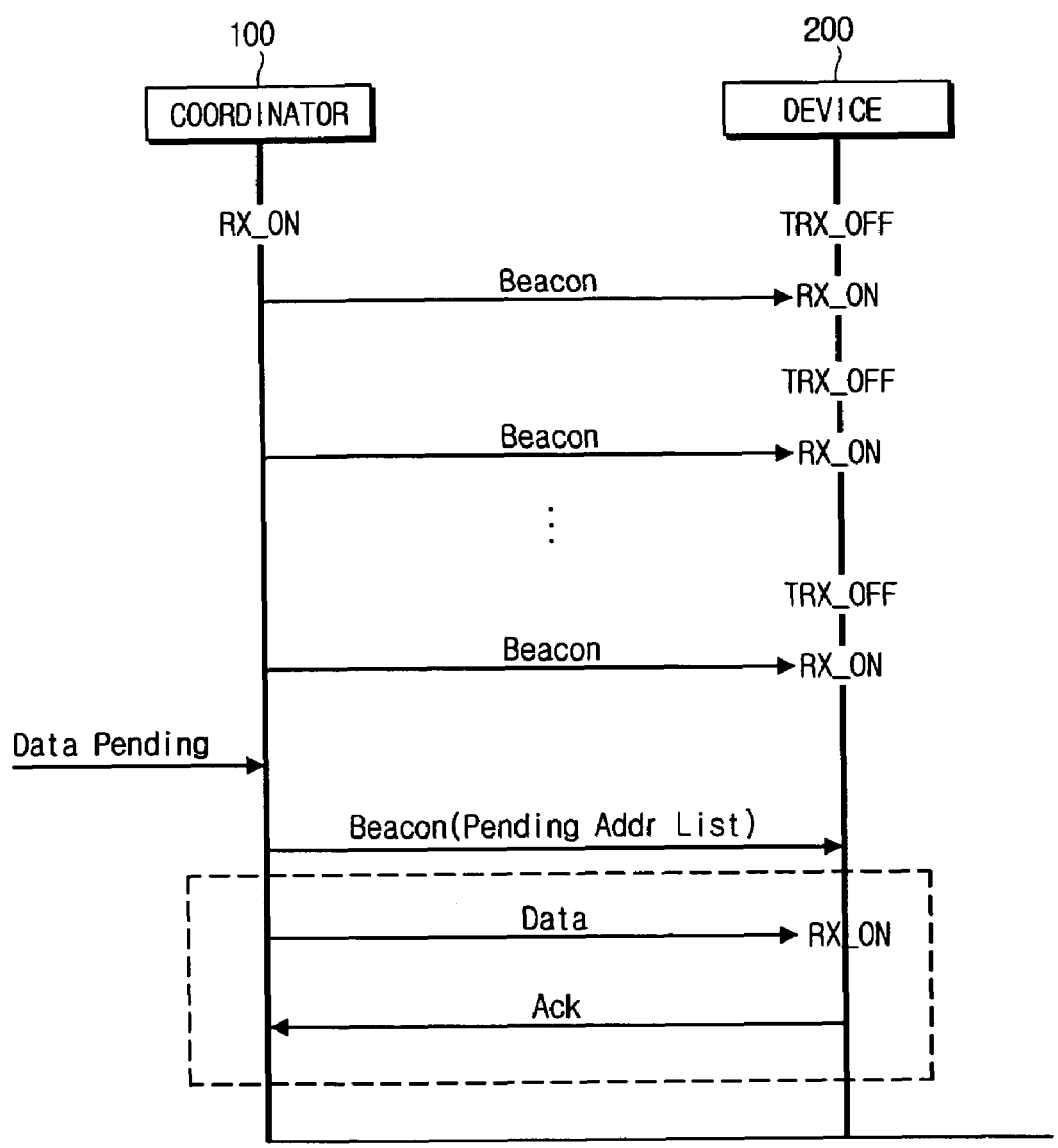
FIG. 3 is a conceptual view to explain a data transmission method and a data reception method in accordance with an exemplary embodiment of the present invention.

FIG. 3 illustrates a conceptual view to explain a data transmission method and a data reception method in accordance with an exemplary embodiment of the present invention, and FIG. 4 illustrates a beacon frame for use in exemplary embodiments of this invention.

Referring to FIG. 3 and FIG. 4, in a case where the coordinator 100 has data to be transmitted to the device 200, the coordinator 100 transmits data in synchronization with a period of the beacon frame.

At this time, the device 200 periodically receives the corresponding beacon frames, keeps synchronized with the coordinator 100 and checks whether there is data to be transmitted thereto or not.

Referring to FIG. 4, the beacon frame to be broadcast from the coordinator 100 has a MAC header field, a MAC payload field and a MAC footer header. The MAC header field includes a frame control bit, a sequence number bit and addressing fields bit.

The frame control bit is determined to be a value, either the value "1" or the value "0," to make the devices and the coordinator be compatibly used with a conventional Zigbee system using the indirect transmission method. For example, in a case where the bit value is "1," data is directly transmitted from the coordinator 100 to the device 200 in the same manner as the method in accordance with exemplary embodiments of the present invention, but contrary to the case in which the bit value is "0," the data is indirectly transmitted from the coordinator 100 to the device 200. Even though the bit value is determined with the opposite manner, it is natural that the data transmission/reception method using the frame control bit value is in the scope of the present invention.

The MAC payload bit includes a super frame specification, GTS fields and pending address fields.

In a case where the frame control bit has the value "1," the address for the device 200 to receive the data is recorded in the pending address fields, and the beacon frame is transmitted to the corresponding device 200. At this time, the device 200 recognizes that there is data to be received and keeps its state as RX_ON. That is, in a case where there is data to be transmitted to the devices 200 from the coordinator 100, each corresponding device 200 is allocated with each corresponding data transmission slot. The allocation order of the slots is matched with the generation order of the data to be transmitted, and the coordinator 100 allocates data transmission slots to the corresponding devices 200 according to the order that the addresses corresponding to the devices 200 are recorded.

That is, the device 200 allocated with a first address keeps its state as RX_ON in a first slot with respect to the beacon frame, and the device 200 allocated with a second address keeps its state as RX_ON in a second slot.

FIG. 5 illustrates a conceptual view to explain the data transmission/reception methods in accordance with an exemplary embodiment of the present invention where there are n transaction data to be transmitted to the devices 200 by the coordinator 100. In accordance with exemplary embodiments of the present invention, a maximum of seven transaction data can be stored.

Here, the transmission slot has a length corresponding to 300 symbols (4.8 ms). The length of the transmission slot is the sum of the maximum data size, 127 bytes, to be transmitted and the reply data size, 10 bytes, and defines the maximum transmission time that it takes for the coordinator 100 to transmit data to the device 200. The total data transmission time that it takes for the coordinator 100 to transmit all seven transaction data is about 33.6 ms.

In a case where some devices 200 have data to be transmitted to the coordinator 100, the corresponding devices 200 transmit the data after the devices 200 completely receive the seven transaction data. This is why the corresponding devices 200 can check the number of packets pending and determines the completion time of the data transmission by the coordinator 100 by receiving the beacon frames.

FIG. 6 is a flow chart showing a data transmission method and a data reception method in accordance with an exemplary embodiment of the present invention.

Referring to FIG. 2 through FIG. 6, the data transmission method and the data reception method in accordance with exemplary embodiments of the present invention are compatible with a Zigbee system using the typical indirect transmission method. Therefore, in a case where the pending bit in the beacon frame has the value "1," data is transmitted in the direct transmission method (S410, Y). Of course, the contrary case is possible.

In a case of transmitting data in the direct transmission method, beacon frames having addresses corresponding to the respective devices to receive data are transmitted by the coordinator 100 at predetermined intervals (S420), and the devices 200 receive the beacon frames (S430).

In a case where there are many data to be transmitted to a plurality of the devices 200, each device 200 is allocated with each data transmission slot. The order of the slots to be allocated to the devices 200 is the same as the generation order of the data to be transmitted. The devices 200 keep their states as RX_ON in their allocated slots, respectively (S440). The data are sequentially received by the devices 200 in the order that the coordinator 100 recorded the device's addresses in the beacon frames (S450).

Meanwhile, in a case where the frame pending bit in the beacon frame has the value "0," the data is transmitted in the indirect method (S410, N). That is, when the coordinator 100 has the data, the coordinator transmits the data after receiving a data request command from the device 200 (S460).

That is, the coordinator 100 does not directly transmit the data but informs the device 200 of existence of the data to be transmitted to the device 200. Then, the coordinator 100 records the address of the corresponding device 200 into the pending address field of the beacon frame and transmits the beacon frame to the device 200. After receiving the beacon frame, the corresponding device 200 which received the beacon frame recognizes that there is data to be received and sends a data request command to the coordinator 100. The device 200 keeps its state as RX_ON after sending the data request command, so that the device 200 can receive the data from the coordinator 100.

As described above, the data transmission method and the data reception method in accordance with exemplary embodiments of the present invention can reduce the data transmission/reception time and prevent power waste. The methods in accordance with exemplary embodiments of the present invention can improve system usability because they are compatible with conventional Zigbee systems using the indirect transmission method.

In accordance with exemplary embodiments of the present invention, if there is data to be transmitted to a device in a Zigbee system, a coordinator can transmit the data without waiting for reception of a data request command. Accordingly, the present invention can reduce a data transmission/reception time in a Zigbee system.

Further, the present invention can reduce power consumption needed to transmit a data request command or to exchange data and the data request commands between the coordinator and a plurality of the devices. Still further, since the present invention is designed to be compatible with a typical Zigbee system using an indirect transmission method, this invention can improve system usability.

Although exemplary embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A data transmission method of a coordinator in a Zigbee system which includes at least one device and the coordinator for coordinating the at least one device, wherein the coordinator transmits data to the at least one device in a direct transmission method in a case where a frame pending bit in a beacon frame is determined to be a value representing the direct transmission method, the data transmission method comprising:

generating the beacon frame having an address of a device to receive the data and a data transmission time; and transmitting the data at the data transmission time.

2. The data transmission method as recited in claim 1, wherein the frame pending bit in the beacon frame can be determined to be a different value representing an indirect transmission method, in which the coordinator transmits the data after receiving a data request command, and the different value being provided to make the data transmission method compatible with a system using the indirect transmission method.

3. The data transmission method as recited in claim 1, wherein an order of data transmissions to the at least one device is determined by an address recorded order which is recorded in the beacon frame.

4. The data transmission method as recited in claim 1, wherein the coordinator informs the at least one device of existence of data to be transmitted to the at least one device, records the address of the device to receive the data into an address field of the beacon frame and transmits the beacon frame to the device.

5. The data transmission method as recited in claim 1, wherein in the direct transmission method, the coordinator directly transmits the data to the at least one device without waiting to receive a data request command from the at least one device when the coordinator has data to transmit to the at least one device.

6. A data reception method, in which a device receives data from a coordinator, in a Zigbee system including at least one device and the coordinator for coordinating the at least one device, wherein the data received by the at least one device is transmitted by the coordinator in a direct transmission method in a case where a frame pending bit in a beacon frame is determined to be a value representing the direct transmission method, the data reception method comprising:
    checking by the device whether a received beacon frame contains information of existence of data to be received by the device and a data transmission time; and
    keeping a state of the device as RX_ON at the data transmission time if the device realizes the existence of data.

7. The data reception method as recited in claim 6, wherein a maximum number of data transmission slots allocated to the at least one device based on the beacon frames is seven, and a maximum size of one slot is 4.8 ms

8. The data reception method as recited in claim 6, wherein the coordinator directly transmits the data to the device without waiting to receive a data request command from the device when the coordinator has data to transmit to the device in the direct transmission method.

9. A coordinator for coordinating at least one device in a Zigbee system, the coordinator comprising:
    a coordinator transmitter which provides a communication interface between the at least one device and the coordinator;
    a beacon frame generator which generates a beacon frame containing an address of each device to receive data; and
    a coordinator controller which sequentially transmits data to the at least one device according to a recording order of addresses.

10. The coordinator as recited in claim 9, wherein the data is sequentially transmitted to the at least one device in a direct transmission method in which the coordinator controller directly transmits the data to the at least one device without waiting to receive a data request command from the at least one device when the coordinator controller has data to transmit to the at least one device.

11. A device for receiving data from a coordinator in a Zigbee system, the device comprising:
    a device transmitter which provides a communication interface between the coordinator and the device;
    a slot counter which counts data transmission slots allocated to all devices in the Zigbee system based on beacon frames and confirms a data transmission order;
    a data request command generator which generates a data request command in a case where the device is compatibly used with an indirect transmission system; and
    a device controller which keeps a state of the device as RX_ON in turn according to the data transmission order.

12. The device as recited in claim 11, wherein the data received by the device is transmitted by the coordinator in a direct transmission method in which the coordinator directly transmits the data to the device without waiting to receive the data request command from the device when the coordinator has data to transmit to the device.

* * * * *